(12) United States Patent
Safavi

(10) Patent No.: US 8,462,898 B2
(45) Date of Patent: Jun. 11, 2013

(54) SYSTEM AND METHOD FOR BLIND COMPENSATION AND CORRECTION OF TRANSMITTER IQ IMBALANCE AT THE RECEIVER

(75) Inventor: Saeid Safavi, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 908 days.

(21) Appl. No.: 12/165,510

(22) Filed: Jun. 30, 2008

(65) Prior Publication Data

US 2009/0323861 A1 Dec. 31, 2009

(51) Int. Cl.
*H04B 1/10* (2006.01)

(52) U.S. Cl.
USPC .......................................... 375/346; 375/260

(58) Field of Classification Search
USPC ................ 375/220, 230, 232, 235, 296, 260, 375/316–352
See application file for complete search history.

(56) References Cited

U.S. PATENT DOCUMENTS 7,274,750 B1 * 9/2007 Mueller ......................... 375/297
7,626,921 B2 * 12/2009 Egashira et al. ............... 370/208
2005/0180534 A1 * 8/2005 Brotje et al. ................... 375/350

* cited by examiner

*Primary Examiner* — Sam K Ahn
*Assistant Examiner* — Janice Tieu
(74) *Attorney, Agent, or Firm* — Bruce W. Greenhaus; Sheppard Mullin Richter & Hampton LLP

(57) ABSTRACT

Systems and methods of correcting for a transmitter IQ imbalance are disclosed. Various embodiments collect statistics related to a received packet on a transceiver. These statistics include one or more transmitter imbalance parameters. In some embodiments, an estimated inversion matrix is calculated based on the imbalance parameter and a correction for the IQ imbalance is made by applying the inversion matrix to a sub-carrier and the sub carrier's image.

19 Claims, 5 Drawing Sheets

SYSTEM AND METHOD FOR BLIND COMPENSATION AND CORRECTION OF TRANSMITTER IQ IMBALANCE AT THE RECEIVER

TECHNICAL FIELD

The disclosed method and apparatus relates to communication systems, and more particularly, some embodiments relate to IQ imbalance compensation and correction for communication systems.

DESCRIPTION OF THE RELATED ART

With the continued increase in levels of integration in semiconductor devices and the constant drive to reduce power consumption, size and cost, while increasing capabilities, designers of contemporary communications devices are facing numerous challenges. Wired and wireless communication devices are no exception. In traditional broadcast systems where one device is broadcasting to many receivers, it is possible, and often practical, to design the broadcasting system to more rigorous specifications. However, in a distributed network or other like environment, it is not always commercially practical to design each of the devices to the highest standards. Accordingly, in contemporary communication devices, a low-cost, practical implementation of the physical layer presents a unique challenge in view of variations associated with the device componentry.

One such challenge involves the imbalance that typically occurs between the in-phase (I) and quadrature-phase (Q) branches when the received radio-frequency (RF) signal is down-converted to baseband. Similarly at a transmitter IQ imbalance can be introduced during frequency up-conversion (from baseband to RF). IQ imbalance can be the result of "amplitude", "phase" and "delay" mismatch between the I & Q branches in quadrature heterodyne communications. Particularly, in typical communication systems, the gain and phase responses of the I and Q branches can be different from one another, resulting in signal distortion. The IQ imbalances can limit the achievable operating signal-to-noise ratio (SNR) at the receiver, which can adversely impact constellation sizes and data rates. This imbalance can occur with both heterodyne receivers as well as with the so-called zero-IF, or direct-conversion receivers. Although the direct conversion receiver is preferable for low-cost and power-sensitive applications, it tends to be more sensitive to IQ imbalance. With IQ imbalances, translated spectral components from both the desired frequency bin and the associated 'image' frequency bin come in to play, although the former usually dominate.

FIG. 1 is a diagram illustrating an example of a transmit-receive IQ imbalance baseband model in an OFDM system. Referring now to FIG. 1, data $X(1, 1)$ to $X(N, 1)$ is input into a Fast Fourier Transform (IFFT) 104. The IFFT of the data is converted from parallel to serial in a parallel-to-serial converter (P/S) 106 that can be modeled as: $x(t)=x_1(t)+jx_Q(t)$.

Transmission IQ imbalance from the up-conversion is modeled in block 108. The up-converted signal $x(t)$ is applied for transmission over the channel 110. This signal transmitted over the channel is modeled as: $p(t)=p_1(t)+jp_Q(t)$. This signal is the baseband equivalent of up-converted version of $x(t)$ and includes the transmit IQ imbalance that results from the up-conversion. The IQ imbalance is caused by amplitude, phase or delay mismatches between the & Q branches in quadrature heterodyne communications.

A signal $y(t)=y_1(t)+jy_Q(t)$ models the signal received at the receive front-end prior to down-conversion by a down-converter 112. This signal includes the transmit IQ imbalance that results from the up-conversion and any noise or distortions introduced by the channel 110. The down-converted signal can be modeled as: $z(t)=z_1(t)+jz_Q(t)$. The signal $z(t)$ is an output of the down-converter 112 and includes the transmit IQ imbalance that results from the up-conversion and any noise or distortions introduced by the channel 110. Additionally, this signal includes receive IQ imbalance that results from the down-conversion.

Generally, an OFDM transmitter and receiver will transmit and receive signals divided into multiple bins. For each of these signals IQ imbalance, as seen at the receiving node of an OFDM communication link, contains the combined effect of transmitter and receiver IQ imbalances. It can be shown that, after down conversion, every received tone pair and its image received at the receiving node of an OFDM modem is related to the pre-IQ distorted transmitted tone pair by:

$$\begin{bmatrix} Z(k,l) \\ Z^*(-k,l) \end{bmatrix} = K_{rx} \begin{bmatrix} Y(k,l) \\ Y^*(-k,l) \end{bmatrix} = K_{rx} C_k K_{tx} \begin{bmatrix} X(k,l) \\ X^*(-k,l) \end{bmatrix}$$

where $Z(k,l)$ and $Z(-k,l)$ are received tone pairs at sub-carrier index k and symbol number I and $X(k,l)$ and $X(-k,l)$ are pre-IQ distortion transmit data tone pairs at sub-carrier index k and symbol number I.

After RX IQ imbalance correction which is equivalent to multiplying by $K_{Rx}^{-1}$, the receive IQ imbalance matrix yields $$\begin{bmatrix} Y(k,l) \\ Y^*(-k,l) \end{bmatrix} = C_k K_{tx} \begin{bmatrix} X(k,l) \\ X^*(-k,l) \end{bmatrix},$$

which is the received signal before receive RX IQ distortion. The receive IQ imbalance matrix is $$K_{rx} = \begin{bmatrix} \alpha_{rx} & \beta_{rx} \\ \beta_{rx}^* & \alpha_{rx}^* \end{bmatrix}$$

and similarly, $$K_{tx} = \begin{bmatrix} \alpha_{tx} & \beta_{tx} \\ \beta_{tx}^* & \alpha_{tx}^* \end{bmatrix}$$

is the transmit IQ imbalance matrix. Additionally, the channel is assumed stationary and can be modeled as:

$$C_k = \begin{bmatrix} C(k) & 0 \\ 0 & C^*(-k) \end{bmatrix},$$

with tone index k.

FIG. 2 is a diagram illustrating example signals that can be transmit over a system such as the one in FIG. 1. Referring now to FIG. 2, the signals $P(k,l)=\alpha_{tx}X(k,l)+\beta_{tx}X^*(-k,l)$ and $Z(k,l)\alpha_{rx}Y(k,l)+\beta_{rx}Y^*(-k,l)$ are illustrated. $P(k, 1)$ models the signals output from the transmit up-conversion model 108 and $Z(k, 1)$ models the signals output from the receive down-conversion model.

$P^*(k,l)$ 200, $P^*(-k,l)$ 202, $P(-k,l)$ 204, and $P(k,l)$ are illustrated in FIG. 2. These signals can be modeled in time domain as: $p(t)\alpha_{tx}x(t)+\beta_{tx}x^*(t)$ with:

$$\alpha_{tx} = \frac{1 + g_{tx}e^{j\varphi_{tx}}}{2}$$

and $$\beta_{tx} = \frac{1 - g_{tx}e^{j\varphi_{tx}}}{2}.$$

Similarly, Z(−k,l) 208 and Z(k,l) 210 are also illustrated in FIG. 2. These signals can be modeled as: $z(t) = \alpha_{rx} y(t) + \beta_{rx} y^*(t)$ with:

$$\alpha_{rx} = \frac{1 + g_{rx}e^{-j\varphi_{rx}}}{2}$$

and $$\beta_{rx} = \frac{1 - g_{rx}e^{j\varphi_{rx}}}{2}.$$

IQ imbalance of various real-world systems can be modeled in baseband equivalent format as described above. The IQ imbalance is a distortion, which causes inter-carrier interference (ICI), e.g., cross-talk between the sub-carriers in frequency domain. Many algorithms jointly estimate and remove the effect of transmit-receive IQ imbalance through performing some form of optimal or suboptimal, frequency domain equalization. This equalization is generally based on error minimization metrics such as least-mean-squared (LMS). Some other approaches try to separate IQ imbalance effect and then estimate and compensate for each distortion separately.

In some cases, if the receiving node switches to another transmitter, the previously estimated IQ imbalance correction may not be valid anymore because, when a receiving node switches to another transmitter, the previous estimated IQ imbalance is based on the previous transmitter balance. Accordingly, assuming that a transmitter that signals that are received from before a switch does not have the same transmit IQ imbalance parameters as a transmitter that signals that are received from after a switch, performance degradation will appear due to the residual IQ imbalance. This is true even if the receiver imbalance parameters have not changed.

For algorithms that compensate for the joint effect of transmit and receive IQ imbalance an alternative is to perform a second IQ correction to compensate for the effect of transmitter imbalance change caused by communicating with a new node. However, this would generally require storage of a large number of tap coefficients per sub-carrier pair for each link, which would generally require a large amount of memory as the number of links increases.

BRIEF SUMMARY OF EMBODIMENTS OF THE DISCLOSED METHOD AND APPARATUS

Various embodiments are directed toward systems and methods for correcting a transmitter IQ imbalance. Some embodiments collect statistics related to a received packet on a transceiver. These statistics include one or more imbalance parameters. In some embodiments, an estimated inversion matrix is calculated based on the imbalance parameter and a correction for the IQ imbalance is made by applying the inversion matrix to a sub-carrier and the sub carrier's image.

In various embodiments, the statistics are collected over a series of packets, a series of sub-carriers or both. The number of data bit transmissions used for the collection of data can vary. For example, in some embodiments the statistics are collected over at least 100 data bit transmissions, at least 1,000 data bit transmissions or at least 10,000 data bit transmissions.

Additionally, in some embodiments, various factors can be calculated based on the collected statistics. For example, in one embodiment, the factor $$\frac{\overline{\alpha_{tx}} \overline{\beta_{tx}^*}}{\eta_{tx}^2}$$

is computed based on the collected statistics. This factor may be used to calculate the inversion matrix $K^{-1}_{tx}$ that can be used to provide IQ imbalance correction. In various embodiments $\alpha_{tx}$, $\beta_{tx}$, $\mu_{tx}$ and $K^{-1}_{tx}$ are calculated, as described below.

In some embodiments, the Expression for Estimation Factor can be derived as:

$$\frac{\overline{\alpha_{tx}} \overline{\beta_{tx}^*}}{\eta_{tx}^2} = \frac{E\{P(k,l)P(-k,l)\}}{E\{|P(k,l) - P^*(-k,l)|^2\}},$$

(assuming E{X(k,l)X(−k,l)}=0)
where N, N' are the chosen subsets of subcarrier indices (k) and sample time indices (l) and P(k,l) are collected at the output of channel equalizer as shown in FIG. 2 and defined by:

$$\begin{bmatrix} P(k,l) \\ P^*(-k,l) \end{bmatrix} = K_{tx} \begin{bmatrix} \hat{X}(k,l) \\ \hat{X}^*(-k,l) \end{bmatrix},$$

$$K_{tx} = \begin{bmatrix} \alpha_{tx} & \beta_{tx} \\ \beta_{tx}^* & \alpha_{tx}^* \end{bmatrix}$$

$$\frac{\overline{\alpha_{tx}} \overline{\beta_{tx}^*}}{\eta_{tx}^2} = \frac{\sum_{k \in N} \sum_{l \in N'} P(k,l)P(-k,l)}{\sum_{k \in N} \sum_{l \in N'} |P(k,l) - P^*(-k,l)|^2},$$

(assuming E{X(k,l)X(−k,l)}=0)
where N, N' are the chosen subsets of subcarrier indices (k) and sample time indices (l).

After statistics collection (collecting samples P(k,l) P(−k,l)), the following set of equations an be used to compute the inverse matrix $K_{tx}^{-1}$.

$$\hat{K}_{tx}^{-1} = \begin{bmatrix} \hat{\alpha}_{tx} & \hat{\beta}_{tx} \\ \hat{\beta}_{tx}^* & \hat{\alpha}_{tx}^* \end{bmatrix}^{-1} = \frac{1}{|\hat{\alpha}_{tx}|^2 - |\hat{\beta}_{tx}|^2} \begin{bmatrix} \hat{\alpha}_{tx}^* & -\hat{\beta}_{tx} \\ -\hat{\beta}_{tx}^* & \hat{\alpha}_{tx} \end{bmatrix}$$

$$\hat{\alpha}_{tx} = \frac{1+\hat{\eta}_{tx}+j\hat{\gamma}_{tx}}{2} = \frac{1+\left(\sqrt{4\text{Re}\left\{\frac{\widetilde{\alpha_{tx}\beta_{tx}}}{\eta_{tx}^2}\right\}-4\left(\text{Im}\left\{\frac{\widetilde{\alpha_{tx}\beta_{tx}}}{\eta_{tx}^2}\right\}\right)^2+1}\right)^{-1}\times\left(1-j\left[2\text{Im}\left\{\frac{\widetilde{\alpha_{tx}\beta_{tx}}}{\eta_{tx}^2}\right\}\right]\right)}{2}$$

$$\hat{\beta}_{tx} = \frac{1-\hat{\eta}_{tx}-j\hat{\gamma}_{tx}}{2} = \frac{1-\left(\sqrt{\text{Re}\left\{\frac{\widetilde{\alpha_{tx}\beta_{tx}}}{\eta_{tx}^2}\right\}-4\left(\text{Im}\left\{\frac{\widetilde{\alpha_{tx}\beta_{tx}}}{\eta_{tx}^2}\right\}\right)^2+1}\right)^{-1}\times\left(1-j\left[2\text{Im}\left\{\frac{\widetilde{\alpha_{tx}\beta_{tx}}}{\eta_{tx}^2}\right\}\right]\right)}{2}$$

where $\hat{\eta}_{tx}=g_{tx}\cos(\phi_{tx}), \hat{\gamma}_{tx}=g_{tx}\sin(\phi_{tx})$ and $$\frac{\widetilde{\alpha_{tx}\beta_{tx}}}{\eta_{tx}^2}$$

is computed from:

$$\frac{\widetilde{\alpha_{tx}\beta_{tx}}}{\eta_{tx}^2} = \frac{\sum_{k\in N}\sum_{l\in N'} P(k,l)P(-k,l)}{\sum_{k\in N}\sum_{l\in N'}|P(k,l)-P^*(-k,l)|^2},$$

(assuming $E\{X(k,l)X(-k,l)\}=0$)
where N, N' are the chosen subsets of subcarrier indices (k) and sample time indices (l).

In some embodiments, the estimation factor introduced in [0016] is established by averaging over time and across subcarriers. In some embodiments, an inverse matrix of IQ imbalance is constructed based on the estimation factor. The inversion matrix can be used to correct a receive IQ imbalance. In some embodiments, outputs from a receiver IQ compensation block or a channel equalization block are multiplied by the inversion matrix to compensate for receive IQ imbalance caused by a transmitter. Accordingly, blind IQ compensation is used to compensate for IQ imbalances that are not corrected by the receiver IQ compensation block. For example, in some embodiments, the receiver IQ compensation block corrects for IQ imbalances caused by the receiver while the inversion matrix compensates for received IQ imbalance caused by a transmitter.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical or example embodiments of the disclosed method and apparatus. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration, and that the claimed invention be limited only by the claims and the equivalents thereof.

DETAILED DESCRIPTION OF THE EMBODIMENTS OF THE DISCLOSED METHOD AND APPARATUS

Various embodiments of the systems and methods described herein can "blindly" estimate and remove an IQ imbalance present in direct conversion quadrature heterodyne OFDM transceivers. In other words, the IQ imbalance estimate can be made without probing or training. Accordingly, the link is not interrupted in order to make an IQ imbalance estimate. In some embodiments, an algorithm estimates the IQ imbalance caused by transmission as seen at a receiver. This can be done without probing or training through direct processing of the post-received information symbols after the FFT and channel equalization.

Figure 1:
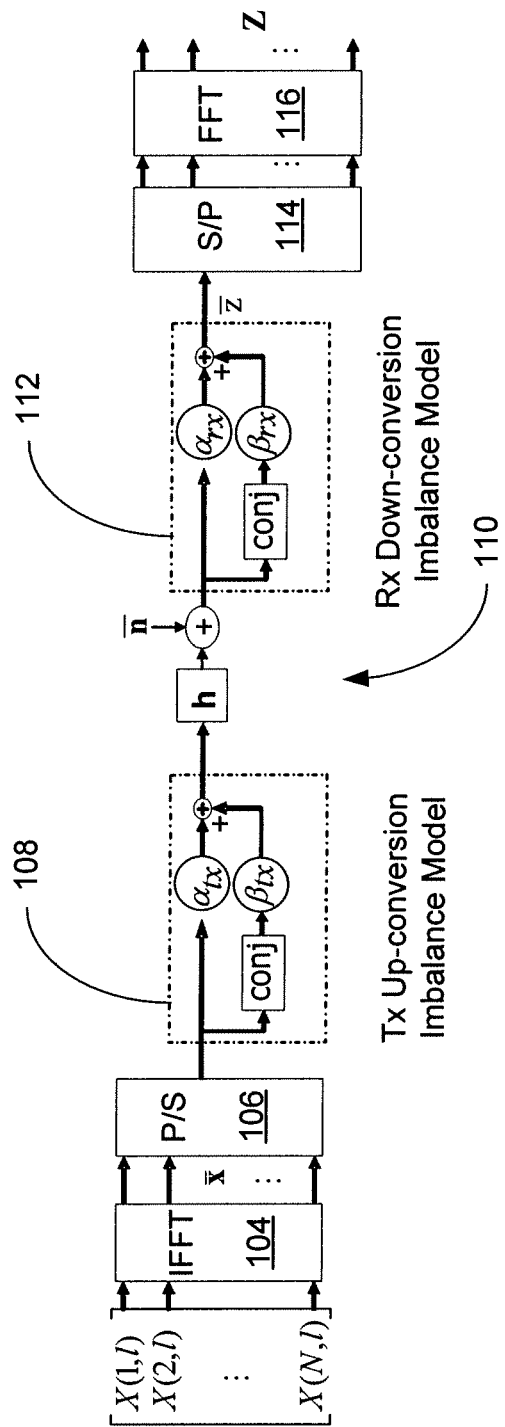
FIG. 1 is a diagram illustrating an example transmit-receive IQ imbalance model in an OFDM system.
Figure 2:
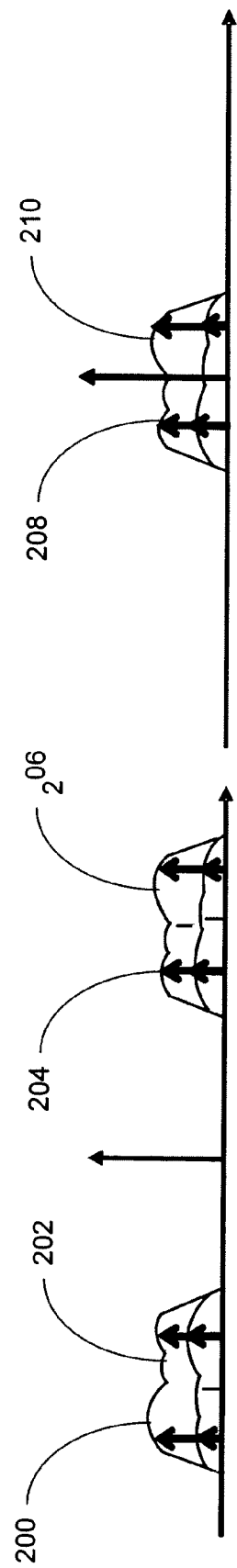
FIG. 2 is a diagram illustrating example signals that can be transmitted over a system that is modeled using the example transmit-receive IQ imbalance model in the OFDM system of FIG. 1.
Figure 3:
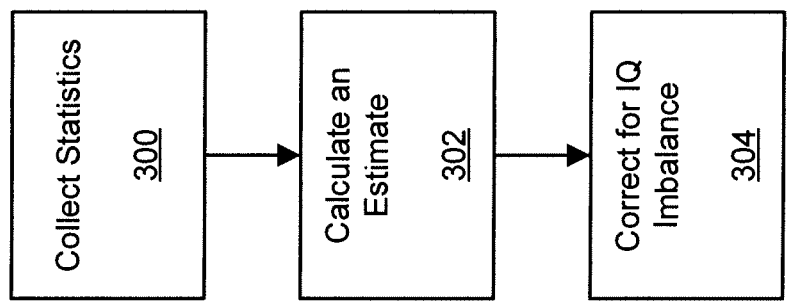
FIG. 3 is a flowchart illustrating an example method for blind compensation and correction of transmitter IQ imbalance at a receiver.

FIG. 3 is a flowchart illustrating an example method for blind compensation and correction of transmitter IQ imbalance at a receiver. Referring now to FIG. 3, in a step 300 statistics related to a received packet on a transceiver are collected. These statistics include one or more imbalance parameters that can be averaged over time and across subcarriers. The averages are used to establish an "estimation factor" that is used to determine imbalance parameters.

In various embodiments, the algorithm is applied to transceivers, which can perform separate receiver and transmitter IQ correction. At the receiver of an OFDM modem every received tone, paired with its image, $[\hat{Y}(k,l),\hat{Y}^*(-k,l)]$ is related to the pre-IQ distortion transmitted tone pair after down conversion $[X(k,l), X^*(-k,l)]$. After the receiver IQ correction and before channel equalization, every received tone image pair at sub-carrier index k and symbol number l, is modeled by:

$$\begin{bmatrix} \hat{Y}(k,l) \\ \hat{Y}^*(-k,l) \end{bmatrix} = C_k K_{tx} \begin{bmatrix} X(k,l) \\ X^*(-k,l) \end{bmatrix},$$

where C(k) is the channel at tone index k and its image and is assumed station:

$$C_k = \begin{bmatrix} C(k) & 0 \\ 0 & C^*(-k) \end{bmatrix}$$

and $$K_{tx} = \begin{bmatrix} \alpha_{tx} & \beta_{tx} \\ \beta_{tx}^* & \alpha_{tx}^* \end{bmatrix}$$

is the transmit IQ imbalance matrix,

After channel equalization the matrix C is effectively multiplied by its inverse and hence the remaining signal carries only the effect of transmit IQ imbalance and we have:

$$\begin{bmatrix} P(k,l) \\ P^*(-k,l) \end{bmatrix} = K_{tx} \begin{bmatrix} \hat{X}(k,l) \\ \hat{X}^*(-k,l) \end{bmatrix},$$

and $$K_{tx} = \begin{bmatrix} \alpha_{tx} & \beta_{tx} \\ \beta_{tx}^* & \alpha_{tx}^* \end{bmatrix}.$$

In some embodiments, the transmit IQ imbalance compensation algorithm estimates the inverse of the matrix $K_{tx}$ using the knowledge of $\alpha_{tx}$ and $\beta_{tx}$ in order to achieve an estimation for X(k,l), X(-k,l)].

A completely blind estimation $K_{tx}$ is possible at a receiving node after the receiver IQ correction and channel equalization is performed. The product $\alpha_{tx} \beta_{tx}$ normalized by $\eta_{tx}$, can be determined by statistics of the interfered symbols. This product, $$\frac{\overline{\alpha_{tx} \beta_{tx}}}{\eta_{tx}^2}$$

is the estimation factor. In other words, the estimation factor can be blindly estimated if at least one pair of symmetric sub-carriers X(k,l), X*(-k,l) are uncorrelated and have zero mean. Due to the randomness of data, this is achievable in practice, particularly if a proper channel coding is applied. The expression for estimation factor can be derived as:

$$\frac{\overline{\alpha_{tx} \beta_{tx}}}{\eta_{tx}^2} = \frac{\sum_{k \in N} \sum_{l \in N'} P(k,l) P(-k,l)}{\sum_{k \in N} \sum_{l \in N'} |P(k,l) - P^*(-k,l)|^2},$$

(assuming E{X(k,l)X(-k,l)}=0
where N, N' are the chosen subsets of subcarrier indices (k) and sample time indices (l)
where ^ represents estimation, E Represents Expectation or Average and:

$$\hat{\eta}_{tx} = g_{tx} \cos(\phi_{tx})$$

$g_{tx}$: Transmitter differential IQ gain imbalance,
$\phi_{tx}$: Transmitter differential IQ phase imbalance
E is the expectation, (k) are subcarrier indices and (l) are sample time or OFDM symbol indices
where P(k,l) are collected at the output of channel equalizer as illustrated in FIG. 3 and described in the equations above.

The equation above is in "ensemble" domain. In other words, each P(k,l) makes up a unit of complementary parts that contribute to the estimation factor. In a practical implementation, the terms of the above equation have to be replaced by sample-based approximation in the temporal domain, e.g. over time. In some embodiments, this is done by an averaging operation over multiple pairs of uncorrelated sub-carriers. Furthermore, the IQ imbalance parameters change very slowly with time. Accordingly, an averaging over time is reasonable. This is summarized by the following equation:

$$\frac{\overline{\alpha_{tx} \beta_{tx}}}{\eta_{tx}^2} = \frac{\sum_{k \in N} \sum_{l \in N'} P(k,l) P(-k,l)}{\sum_{k \in N} \sum_{l \in N'} |P(k,l) - P^*(-k,l)|^2},$$

(assuming E{X(k,l)X(-k,l)}=0)
where N, N' are the chosen subsets of subcarrier indices (k) and sample time indices (l).

In a step 302, an estimated inversion matrix is calculated based on the imbalance parameter computation. In some embodiments, the inversion matrix is calculated by extracting the imbalance parameters from the estimation factor. After statistics collection, collecting samples P(k,l) and P(-k,l), the following set of equations is used to compute the inverse matrix $K_{tx}^{-1}$. In some embodiments, this is a one-time computation.

$$\hat{K}_{tx}^{-1} = \begin{bmatrix} \hat{\alpha}_{tx} & \hat{\beta}_{tx} \\ \hat{\beta}_{tx}^* & \hat{\alpha}_{tx}^* \end{bmatrix}^{-1} = \frac{1}{|\hat{\alpha}_{tx}|^2 - |\hat{\beta}_{tx}|^2} \begin{bmatrix} \hat{\alpha}_{tx}^* & -\hat{\beta}_{tx} \\ -\hat{\beta}_{tx}^* & \hat{\alpha}_{tx} \end{bmatrix}$$

$$\hat{\alpha}_{tx} = \frac{1 + \hat{\eta}_{tx} + j\hat{\gamma}_{tx}}{2} = \frac{1 + \left(\sqrt{4\text{Re}\left\{\frac{\overline{\alpha_{tx} \beta_{tx}}}{\eta_{tx}^2}\right\} - 4\left(\text{Im}\left\{\frac{\overline{\alpha_{tx} \beta_{tx}}}{\eta_{tx}^2}\right\}\right)^2 + 1}\right)^{-1} \times \left(1 - j\left[2\text{Im}\left\{\frac{\overline{\alpha_{tx} \beta_{tx}}}{\eta_{tx}^2}\right\}\right]\right)}{2}$$

-continued $$\hat{\beta}_{tx} = \frac{1-\hat{\eta}_{tx}-j\hat{\gamma}_{tx}}{2} = \frac{1-\left(\sqrt{4\text{Re}\left\{\frac{\overline{\alpha_{tx}\beta_{tx}}}{\eta_{tx}^2}\right\}-4\left(\text{Im}\left\{\frac{\overline{\alpha_{tx}\beta_{tx}}}{\eta_{tx}^2}\right\}\right)^2}+1\right)^{-1} \times \left(1-j\left[2\text{Im}\left\{\frac{\overline{\alpha_{tx}\beta_{tx}}}{\eta_{tx}^2}\right\}\right]\right)}{2}$$

where $\hat{\eta}_{tx} = g_{tx}\cos(\phi_{tx}), \hat{\gamma}_{tx} = g_{tx}\sin(\phi_{tx})$ and $$\frac{\overline{\alpha_{tx}\beta_{tx}}}{\eta_{tx}^2}$$

is computed from:

$$\frac{\overline{\alpha_{tx}\beta_{tx}}}{\eta_{tx}^2} = \frac{\sum_{k\in N}\sum_{l\in N'} P(k,l)P(-k,l)}{\sum_{k\in N}\sum_{l\in N'} |P(k,l)-P^*(-k,l)|^2},$$

(assuming $E\{X(k,l)X(-k,l)\}=0$)
where N, N' are the chosen subsets of subcarrier indices (k) and sample time indices (l).

In a step 304, a correction for the IQ imbalance is made by applying the inversion matrix to a sub-carrier and the sub carrier's image. At this stage, the computed inverse matrix applies to each sub-carrier and its image to remove the effect of transmitter balance. For example, each output of a channel equalizer can be multiplied by the inversion matrix.

In some embodiments of the systems and methods described herein, various algorithms can be applied to receivers, which perform joint receiver and transmitter IQ correction. For example, the methods can be applied to the joint receiver and transmitter IQ correction schemes if the channel does not vary significantly between different links. An algorithm that jointly compensates for the effect of transmit and receive IQ imbalance effectively removes the combined effect of transmit IQ imbalance and receive IQ imbalance. Various systems and methods compute the inverse of the matrix product $(K_{tx}CK_{rx})$ and multiplies the receive signal by the inverse of the matrix product $(K_{tx}CK_{rx})$ to correct the IQ imbalance. In some embodiments, the transmitted symbols can be reconstructed from the following operation:

$$\begin{bmatrix} \hat{X}(k,l) \\ \hat{X}^*(-k,l) \end{bmatrix} = (K_{rx}C_kK_{tx})^{-1} \times K_{rx}C_kK_{tx}\begin{bmatrix} X(k,l) \\ X^*(-k,l) \end{bmatrix} \text{ or}$$

$$\begin{bmatrix} \hat{X}(k,l) \\ \hat{X}^*(-k,l) \end{bmatrix} = K_{tx}^{-1}C_k^{-1}K_{rx}^{-1}K_{rx}C_kK_{tx}\begin{bmatrix} X(k,l) \\ X^*(-k,l) \end{bmatrix}.$$

Now if the receiving node decides to communicate with another transmitter, the change in the transmitter node, for example, from a transmitter$_1$ to a transmitter$_2$, will cause the previous joint IQ estimation and compensation to be invalid. More specifically, the receiver correction based on previous estimation would cause some residual imbalance which is related to the transmitter imbalances of transmitter$_1$ to transmitter$_2$ as shown below:

$$\begin{bmatrix} \hat{X}'(k,l) \\ \hat{X}'^*(-k,l) \end{bmatrix} = (K_{rx}C_kK_{tx1})^{-1} \times K_{rx}C_kK_{tx2}\begin{bmatrix} X(k,l) \\ X^*(-k,l) \end{bmatrix} \text{ or}$$

$$\begin{bmatrix} \hat{X}'(k,l) \\ \hat{X}'^*(-k,l) \end{bmatrix} = K_{tx_1}^{-1}K_{tx_2}\begin{bmatrix} X(k,l) \\ X^*(-k,l) \end{bmatrix} = K_{tx_R}\begin{bmatrix} X(k,l) \\ X^*(-k,l) \end{bmatrix}.$$

This is because, after IQ compensation with the previous coefficients, the receiver sees a residual transmitter imbalance. This residual imbalance is represented as $K_{tx_R} = K_{tx_1}^{-1}CK_{tx_2}$. The blind algorithm can then compensate for the residual imbalance. In various embodiments, the blind algorithm now computes the residual imbalance matrix $K_{tx_R}$ rather than the transmit imbalance matrix $K_{tx}$.

Figure 4:
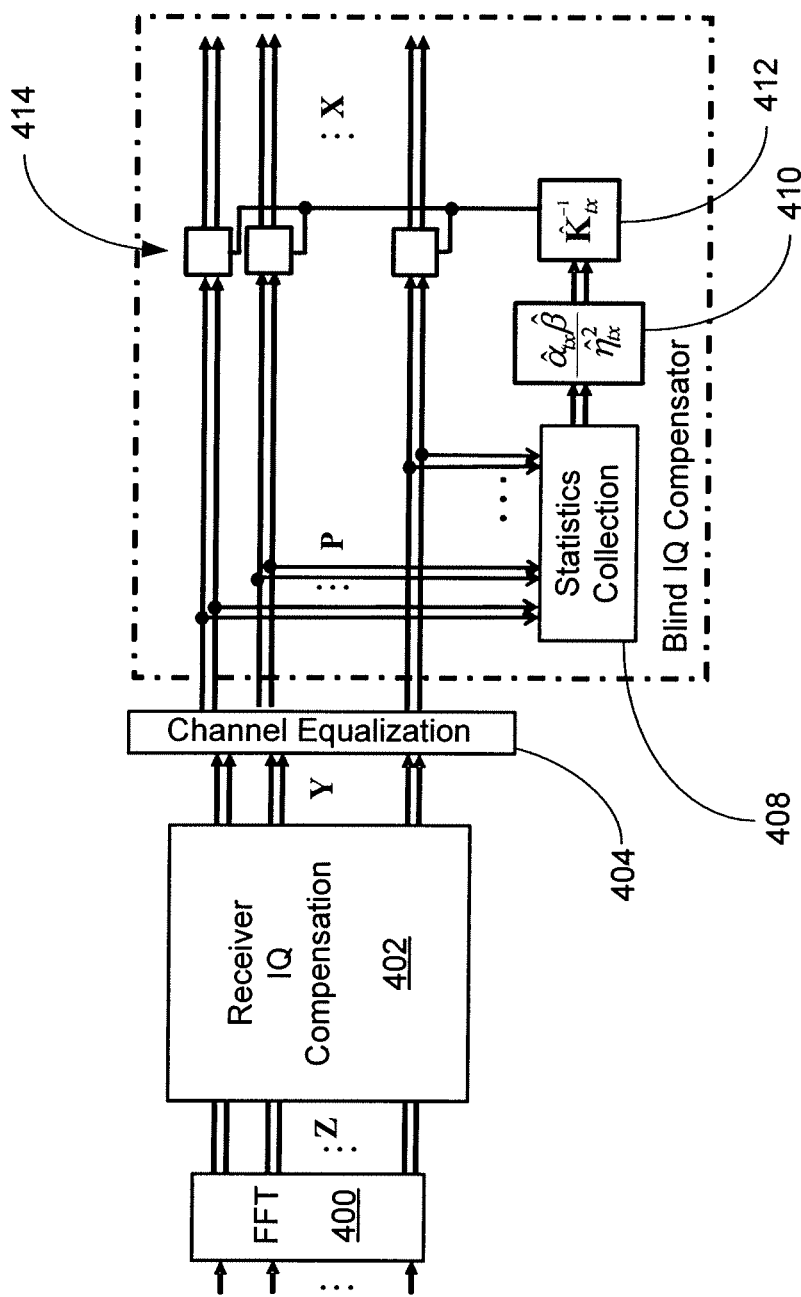
FIG. 4 is a diagram illustrating an example device for blind compensation and correction of transmitter IQ imbalance at a receiver.

FIG. 4 is a diagram illustrating an example device for blind compensation and correction of transmitter IQ imbalance at a receiver. Referring now to FIG. 4, a receiver includes an FFT block 400. This block performs an FFT on received signals z(t). Additionally, receiver IQ compensation is performed in compensation block 402 and channel equalization is performed in equalization block 404. In various embodiments, the outputs of channel equalization block 404 are input into blind IQ compensator 406 for further IQ imbalance correction. For example, in some embodiments, receiver IQ compensation block 402 is used to compensate for IQ imbalance caused by imbalances in the receiver, which generally do not vary as transmitters change; while blind IQ compensation block 406 is used to compensate for received IQ imbalance that is caused by the transmitter.

In various embodiments, the systems and methods for blind IQ compensation are performed in blind IQ compensator 406. The blind IQ compensator 406 includes a statistics collection block 408 that collects statistics related to received packets. These statistics include one or more received signal pair [P(k,l), P/(−k,l)] that can be averaged over time and across sub-carriers. The averages are used to establish an estimation factor, $$\frac{\overline{\alpha_{tx}\beta_{tx}}}{\eta_{tx}^2},$$

that is used to determine imbalance parameters.

Additionally, in some embodiments, various factors can be calculated based on the collected statistics. For example, in the illustrated embodiment, the estimation factor, $$\frac{\overline{\alpha_{tx}\beta_{tx}}}{\eta_{tx}^2},$$

is computed in block 410 based on the collected statistics. In various embodiments, $\alpha_{tx}, \beta_{tx}, \eta_{tx}$ and $K^{-1}_{tx}$ are calculated. In block 412, an inverse matrix of IQ imbalance is constructed based on the estimation factor. This inversion matrix is used to correct for received IQ imbalance. For example, the received signals are corrected by multiplying the inversion matrix of block 412 using the multiplication blocks 414.

Figure 5:
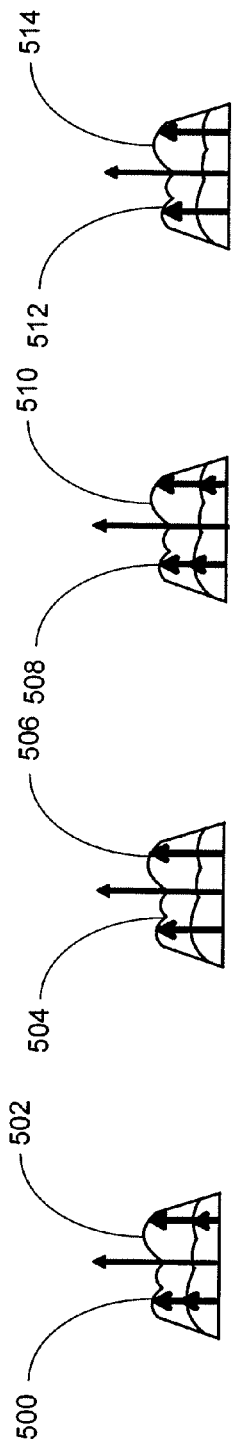
FIG. 5 is a diagram illustrating example signals that can be used to further illustrate blind compensation and correction of transmitter IQ imbalance at the receiver of FIG. 4.

FIG. 5 is a diagram illustrating example signals that can be used to further illustrate blind compensation and correction of transmitter IQ imbalance at the receiver of FIG. 4. Referring now to FIG. 5, received signals Z(k,l) 500 and Z(-k,l) 502 are illustrated. These are the received signals after processing by the FFT 400. The signals Z(k,l) 502 and Z(-k,l) 500 can be modeled as: $\hat{Z}(k,l)=\alpha_{rx}Y(k,l)+\beta_{rx}Y^*(-k,l)$. Z(k,l) 502 and Z(-k,l) 500 are processed by receiver IQ compensation block 402. The output of the IQ compensation block 402 is illustrated by the signals $\hat{Y}(k,l)$ 506 and $\hat{Y}(-k,l)$ 504. These IQ compensated signals can be modeled as: $\hat{Y}(k,l)=\alpha_{tx}X(k,l)+\beta_{tx}X^*(-k,l)+n'(k,l)$.

The output of the channel equalization block 404 is illustrated by P(k,l) 510 and P(-k,l) 508. These signals can be modeled as: $P(k,l)=\alpha_{tx}X(k,l)+\beta_{tx}X^*(-k,l)$. En one embodiment, after channel equalization, signals P(k,l) 510 and P(-k,l) 508 are inputs to a statistics collection block 408 and multiplication blocks 414. The statistics collection block 408 collects statistics related to the received packets P(k,l) 510 and P(-k,l) 508 and the multiplication block is used to correct P(k,l) 510 and P(-k,l) 508 for transmit IQ imbalance at the receiver. For example, in various embodiments, blind IQ compensation is performed on signals P(k,l) 510 and P(-k,l) 508 using the collected statistics to determine $$\frac{\overline{\alpha_{tx}\hat{\beta}_{tx}}}{\overline{\eta_{tx}^2}}$$

and matrix $\hat{K}_{tx}^{-1}$. The signals P(k,l) 510 and P(-k,l) 508 are corrected by multiplying the inversion matrix $\hat{K}_{tx}^{-1}$ using the multiplication blocks 414. After these multiplications, the blind IQ compensation produced signals $\hat{X}(k,l)$ 514 and $\hat{X}(-k,l)$ 512.

Figure 6:
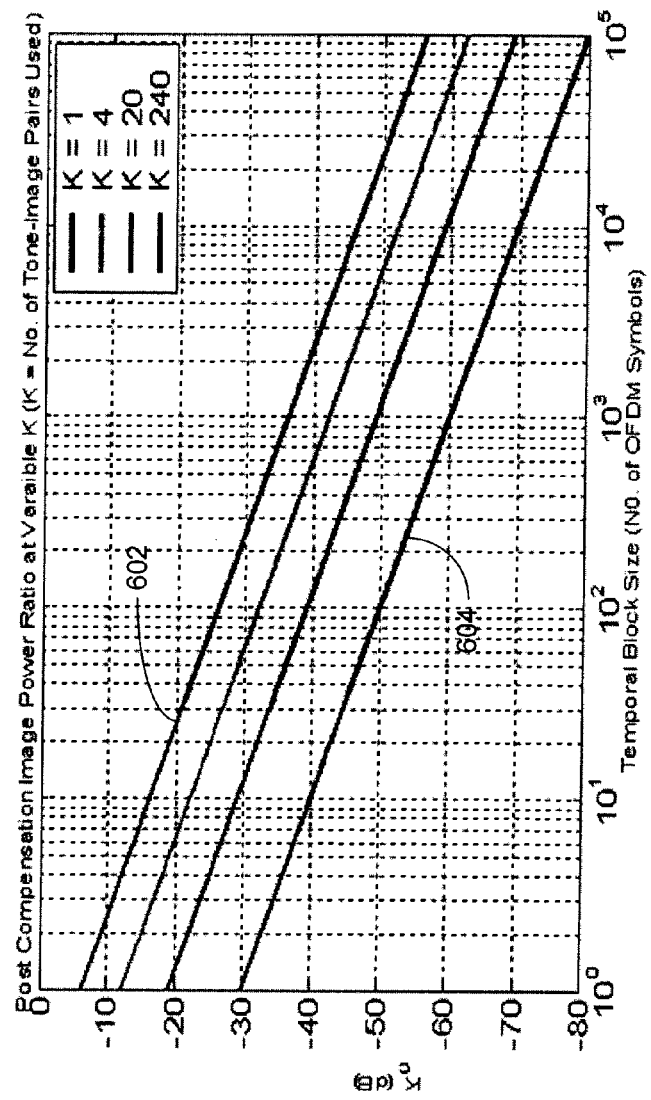
FIG. 6 is a diagram illustrating how time domain and frequency domain samples are interrelated in determining the target averaging value in various embodiments of the systems and methods described herein.

FIG. 6 is a diagram illustrating how time domain and frequency domain samples are interrelated in determining the target averaging value in various embodiments of the systems and methods described herein. In some embodiments, the statistics are collected over a series of packets, a series of sub-carriers or both. The number of data bit transmissions used for the collection of data can vary. For example, the statistics may collected over 100 data bit transmissions, 1,000 data bit transmissions or 10,000 data bit transmissions, etc. As will be understood, statistics may be collection over any number of data bit transmissions.

As illustrated in FIG. 6, the averaging length may be determined by a number of factors, such as, for example, FFT size and digital implementation complexity (both determining the number of frequency bin pairs that can be processed in parallel), the maximum latency, the dynamics of the channel, target performance, analog filtering (determining the band over which subcarriers are not distorted by the analog filter response), etc. From the above, FFT size, digital implementation complexity and analog filter characteristics are the most important parameters in defining the averaging length. In FIG. 6, K is the number of sub-carrier pairs used in averaging and $K_c$ is a performance figure of merit defined as $$K_C = \left|\frac{\beta\hat{\alpha}^* - \alpha^*\hat{\beta}}{\alpha\hat{\alpha}^* - \beta^*\hat{\beta}}\right|^2.$$

$K_c$ defining the power of residual IQ imbalance after correction. Assuming, for example, a $K_c$ value of −50 dB, the systems and methods described herein may need to process around 25,000 symbols if only one sub-carrier pair is used 602. However, with 240 pair of sub-carriers 604 the number of symbols needed for the same performance is reduced to 100.

While various embodiments of the present disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of correcting for a transmitter Inphase Quadrature (IQ) imbalance comprising:
 collecting statistics related to a received packet on a transceiver, the statistics comprising samples from at least one pair of symmetric sub-carriers obtained after receiver IQ compensation and channel equalization;
 calculating an estimation factor of $\frac{\alpha_{tx}^*\beta_{tx}}{\eta_{tx}^2}$ based on the collected statistics, wherein $\alpha_{tx}$ and $\beta_{tx}$ are derived from the transmitter IQ imbalance, and $\eta_{tx}$ is a normalizing factor;
 calculating an imbalance parameter using the estimation factor;
 calculating an estimated inversion matrix based on the imbalance parameter; and
 correcting for the IQ imbalance by applying the inversion matrix to the pair of symmetric sub-carriers.

2. The method of claim 1, wherein the statistics are collected over a series of symbols in one packet.

3. The method of claim 1, wherein the statistics are collected over a series of packets.

4. The method of claim 1, wherein the statistics comprise samples from a plurality of pairs of symmetric sub-carriers.

5. The method of claim 1, wherein the statistics are collected over a series of symbols and a series of packets and comprise samples from a plurality of pairs of symmetric sub-carriers.

6. The method of claim 1, wherein the statistics are collected over a range of data bit transmissions depending on Fast Fourier Transform (FFT) size.

7. The method of claim 1, wherein the statistics are collected over a range of data bit transmissions depending on filter characteristics.

8. The method of claim 1, wherein the statistics are collected over a range of data bit transmissions depending on implementation complexity.

9. The method of claim 1, further comprising calculating $K^{-1}_{tx}$ wherein $K_{tx}$ is a transmit IQ imbalance matrix.

10. The method of claim 1, further comprising averaging over time and across sub-carriers to establish the estimation factor.

11. The method of claim 1, further comprising constructing an inverse matrix of IQ imbalance based on the estimation factor.

12. A communication device comprising:
 a receiver configured to receive packets; a processor, coupled to the receiver and configured to execute instructions;
 a memory, coupled to the processor and configured to store instructions causing the device to:
 collect statistics related to a received packet, the comprising samples from at least one pair of symmetric sub-carriers obtained after receiver Inphase Quadrature (IQ) compensation and channel equalization;
 calculate an estimation factor of $\frac{\alpha_{tx}^*\beta_{tx}}{\eta_{tx}^2}$ based on the collected statistics, wherein $\alpha_{tx}$ and $\beta_{tx}$ are derived from the transmitter IQ imbalance, and $\eta_{tx}$ is a normalizing factor;
 calculate an imbalance parameter using the estimation factor;
 calculate an estimated inversion matrix based on the imbalance parameter; and
 correct for the IQ imbalance by applying the inversion matrix to the pair of symmetric sub-carriers.

13. The device of claim 12, wherein the instructions further cause the device to collect statistics over a series of symbols within one packet.

14. The device of claim 12, wherein the instructions further cause the device to collect statistics over a series of packets.

15. The device of claim 12, wherein the instructions further cause the device to collect statistics comprising samples from a plurality of pairs of symmetric sub-carriers.

16. The device of claim 12, wherein the instructions are further configured to cause the device to collect statistics over a range of data hit transmissions depending on Fast Fourier Transform (FFT) size.

17. The device of claim 12, wherein the instructions are further configured to cause the device to collect statistics over a range of data bit transmissions depending on filter characteristics.

18. The device of claim 12, wherein the instructions are further configured to cause the device to collect statistics over a range of data bit transmissions depending on implementation complexity.

19. The device of claim 12, wherein the instructions are further configured to cause the device to compute $K^{-1}_{tx}$ based on the statistics collected wherein $K_{tx}$ is a transmit IQ imbalance matrix.

* * * * *